Nov. 29, 1938.　　　E. A. CAPILLON　　　2,138,088

SOLDER FILLED WIRE

Filed Feb. 11, 1937

INVENTOR
Edward A. Capillon,
BY Thomas A. Jenkes
ATTORNEY

Patented Nov. 29, 1938

2,138,088

UNITED STATES PATENT OFFICE 2,138,088

SOLDER FILLED WIRE

Edward A. Capillon, Attleboro, Mass., assignor to D. E. Makepeace Company, Attleboro, Mass., a corporation of Massachusetts Application February 11, 1937, Serial No. 125,284

7 Claims. (Cl. 29—182)

My invention relates to improvements in solder filled wire for use in the manufacture of chains and other articles of jewelry. In the machine manufacture of chains the wire is cut off to the desired length and bent into ring shapes or links, each link being formed or threaded through the one preceding it so that a chain results. After the links have been thus strung together they are subjected to a temperature sufficiently high to cause the solder core to melt so as to join together the ends of each link thus resulting in closed links.

Particularly in the manufacture of precious metal chains, such as silver, the former types of silver-copper alloys used in the manufacture of the wire body have had a melting point so close to the flow point of the solder core that in heating the links up to the temperature necessary to cause the solder to flow to join the ends of the links together there has resulted a melting or sagging of the silver-copper body, resulting in much scrap. This has been particularly true in chains made of silver-copper alloys of low fineness, such as 800 fine, the melting point of which alloy is close to the flow point of the silver solder core. This trouble is also encountered in stock of 925 fineness, commonly known as Sterling, although in this case the temperature range or difference between melting and flow points of the silver-copper alloy is substantially larger so that there is somewhat less danger of damaging the links when the solder is melted. Copper, however, has generally been employed in silver alloys for this purpose to harden the alloy and give it longer wearing qualities.

I have discovered, however, that if such wire be constructed of a silver cadmium alloy, it will have a melting point well above that of the flow point of the silver solder cores normally employed, thus eliminating the large amount of scrap formerly made in chain making, particularly in the manufacture of 800 fine chain.

These and such other objects of my invention as may hereinafter appear will be best understood from a description of the accompanying drawing which illustrates various embodiments thereof.

Figure 1:
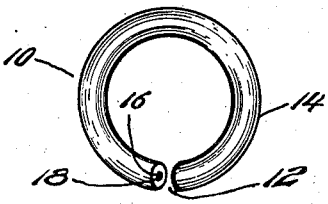
Fig. 1 is a perspective view of a solder filled wire unit bent into link form for use in chain making.
Figure 2:
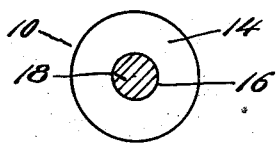
Fig. 2 is an enlarged sectional view thereof.

In the drawing, 10 generally indicates a unit of solder-filled wire constructed in accordance with the principles of my invention bent in a link or ring shape for use in the manufacture of chain having the gap 12 between the ends thereof, which ends become joined solidly after the respective chain links 10 have been strung together and heated. Said wire comprises a tubular body 14, the cavity 16 of which is filled with a solder core 18. It is generally manufactured from a heavy cylindrical bar which is drilled to accommodate a bar of solder, the composite stock being then heated to a temperature high enough to fuse the solder so that it becomes securely fastened to the body on cooling. By suitable mechanical means such as hammering, rolling or drawing through dies, the composite bar is then formed into wire of a diameter suitable for the manufacture of jewelry chains.

My invention particularly relates to a silver solder-filled wire having a tubular body of such a high melting point that it will not be affected by the melting of the solder core to form the closed chain links and as stated hitherto, I have discovered that if I construct my hollow tubular body of a silver cadmium alloy, preferably one containing 77 to 99 per cent of silver and 1 to 23 percent of cadmium, it will have a melting point substantially above the flow point of all standard types of silver solders normally employed as the cores 18. I have found in practice that such alloy must have a melting point at least 100° F. above the flow point of the silver solder core. As examples, but not restricting the invention to these particular compositions, the table given below shows a comparison of the melting temperatures of silver-copper alloys and alloys embodied in this invention. Of the two values given for each alloy, the smaller one is the temperature at which the alloy begins to soften or melt (melting point) while the larger figure is the temperature at which the alloy is completely fluid (flow point). It is evident that in this case the temperature of initial softening or melting is the important one.

| Alloy | Melting range | |
|---|---|---|
| | Melting point | Flow point |
| | °F. | °F. |
| 830 silver—170 copper | 1434 | 1526 |
| 830 silver—50 copper—120 cadmium | 1570 | 1600 |
| Difference | 136 | 74 |
| 925 silver—75 copper (sterling) | 1434 | 1660 |
| 925 silver—75 cadmium (sterling) | 1688 | 1715 |
| Difference | 254 | 55 |

It will be noted from the above that the silver-copper-cadmium and the silver-cadmium alloys which are included in this invention start to soften or melt at appreciably higher temperatures than the straight silver copper alloys.

While the binary silver-cadmium alloys are suitable, it is desirable to add some copper as a hardener in the alloy, the amount of this metal being kept low so as not to materially lower the melting temperature or point.

Another desirable characteristic induced by the substitution of cadmium for copper is a noticeable increase in tarnish resistance of the alloy. It must be understood, however, that complete tarnish resistance is not claimed for these alloys.

Figure 3:
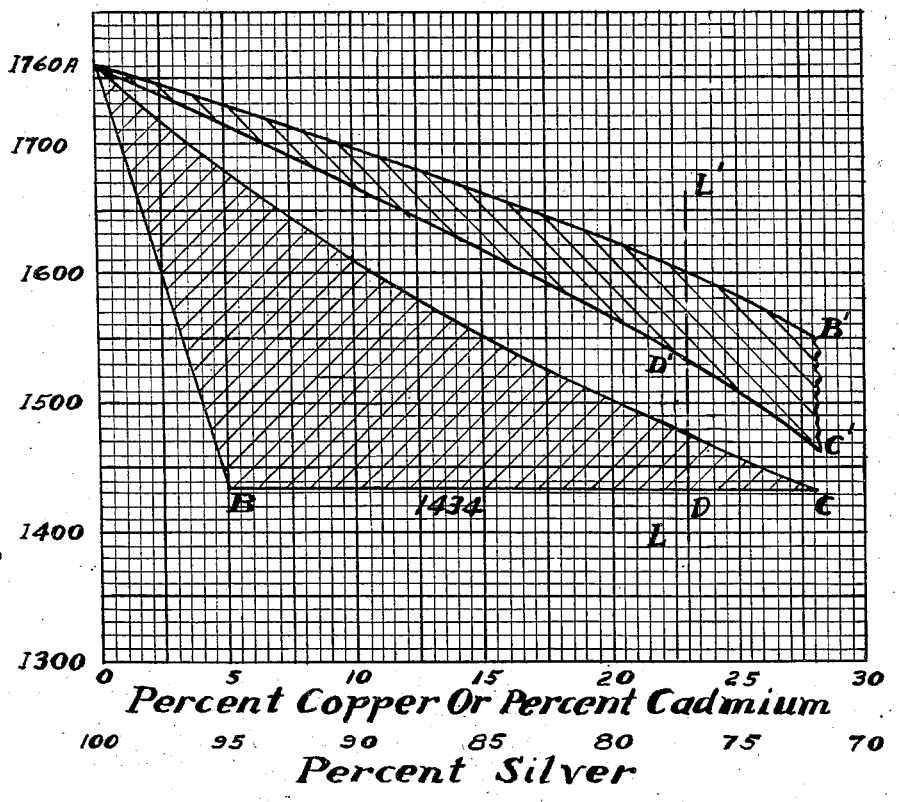
Fig. 3 is a diagram composed of portions of the thermal diagrams of the binary alloy systems silver-copper and silver-cadmium covering the range of compositions which I employ in the manufacture of solder-filled silver wire.

Fig. 3 shows superimposed portions of the thermal diagrams of the binary alloy systems silver-copper and silver-cadmium. The larger shaded area enclosed by the lines AB, BC and CA is the silver-copper while the smaller shaded area is the silver-cadmium. In the silver-copper area the lines AB and BC give the temperatures at which the silver-copper alloys begin to melt for compositions varying between zero and 28 percent copper. Similar temperatures are indicated for the silver-cadmium area by the line AC'.

It will be observed that for all compositions represented in the diagrams the silver-cadmium alloys begin to melt at temperatures higher than the silver-copper alloys. As an example, if one picks the compositions silver 77-cadmium 23 and silver 77-copper 23 as represented by the vertical line LL', one finds a difference of about 100° F. in favor of the silver-cadmium. This is shown by the points of intersection of LL' with the lines AC' and BC, respectively, D' and D, corresponding to temperatures of 1534° F. and 1434° F.

Typical examples of silver solder alloys used as cores in solder-filled wires are as follows:

| | Melting range | |
|---|---|---|
| | Melting point | Flow point |
| | °F. | °F. |
| Silver—63%, copper—26%, zinc—11% | 1275 | 1340 |
| Silver—43%, copper—32%, zinc—25% | 1223 | 1368 |

While it is possible to produce silver solders of lower flow points by changing the proportions of silver and copper and maintaining the zinc at about 25 percent., these solders are not very satisfactory for use in solder-filled wire due to the fact that they show an unduly large expansion on melting. This often results in an excessive flow of solder from the ends of the wire so that the chain links become fused together resulting in a stiff chain which has to be scrapped.

It is understood that my invention is not limited to the specific embodiments shown and that various deviations may be made therefrom without departing from the spirit and scope of the appended claims.

What I claim is:

1. A solder filled wire for use in the manufacture of chain and other articles of jewelry comprising a hollow tubular body comprising a silver cadmium alloy and a silver solder core having a flow point at least 100° below the melting point of said body.

2. A solder filled wire for use in the manufacture of chain and other articles of jewelry comprising a hollow tubular body comprising 77–99 percent silver and 1–23 percent of cadmium and a silver solder core having a flow point at least 100° below the melting point of said body.

3. A solder filled wire for use in the manufacture of chain and other articles of jewelry comprising a hollow tubular body comprises 77–99 percent of silver, 1–22.9 percent of cadmium and .1 to 10 percent of copper and a silver solder core having a flow point at least 100° below the melting point of said body.

4. A solder filled wire for use in the manufacture of chain and other articles of jewelry comprising a hollow tubuar body comprising substantially 83 percent of silver, 12 percent of cadmium and 5 percent of copper, and a silver solder core having a flow point at least 100° below the melting point of said body.

5. A solder filled wire for use in the manufacture of chain and other articles of jewelry comprising a hollow tubular body comprising 96 percent of silver, 3 percent of cadmium and 1 percent of copper, and a silver solder core having a flow point at least 100° below the melting point of said body.

6. A solder filled wire for use in the manufacture of chain and other articles of jewelry comprising a hollow tubular body comprising substantially 83 percent of silver, 5 percent of copper and 12 percent of cadmium, and a silver solder core comprising substantially 63 percent silver, 26 percent copper and 11 percent zinc.

7. A solder filled wire for use in the manufacture of chain and other articles of jewelry comprising a hollow tubular body comprising substantially 96 percent of silver, 3 percent of cadmium and 1 percent of copper, and a silver solder core comprising substantially 63 percent silver, 26 percent copper and 11 percent zinc.

EDWARD A. CAPILLON.